W. A. VAN BERKEL.
MEAT SLICING MACHINE.
APPLICATION FILED NOV. 10, 1908.

920,506.

Patented May 4, 1909.
5 SHEETS—SHEET 1.

Witnesses:
P. F. Nagle
L. Courville

Inventor.
By Wilhelmus Adrianus Van Berkel
Wiedersheim & Fairbanks
Attorneys.

W. A. VAN BERKEL.
MEAT SLICING MACHINE.
APPLICATION FILED NOV. 10, 1908.

920,506.

Patented May 4, 1909.
5 SHEETS—SHEET 2.

Witnesses:
P. F. Nagle
L. Douville.

Inventor:
By Wilhelmus Adrianus Van Berkel
Wiedersheim & Fairbanks
Attorneys.

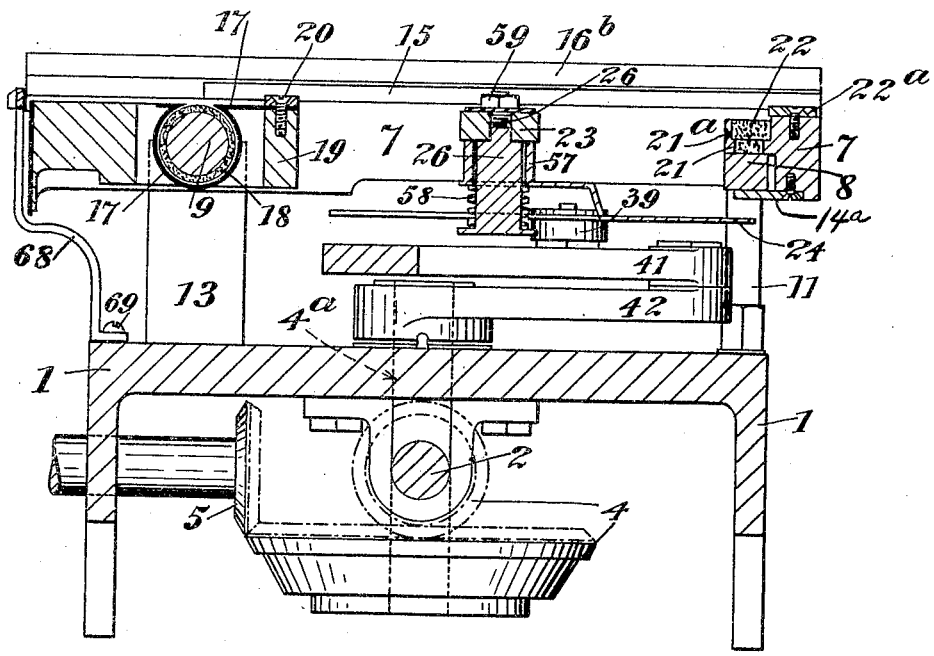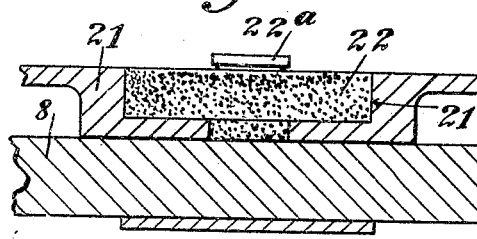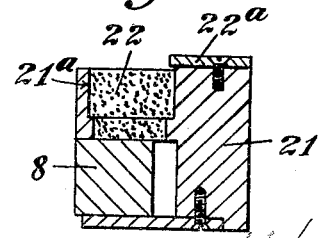

W. A. VAN BERKEL.
MEAT SLICING MACHINE.
APPLICATION FILED NOV. 10, 1908.
920,506.
Patented May 4, 1909.
5 SHEETS—SHEET 4.
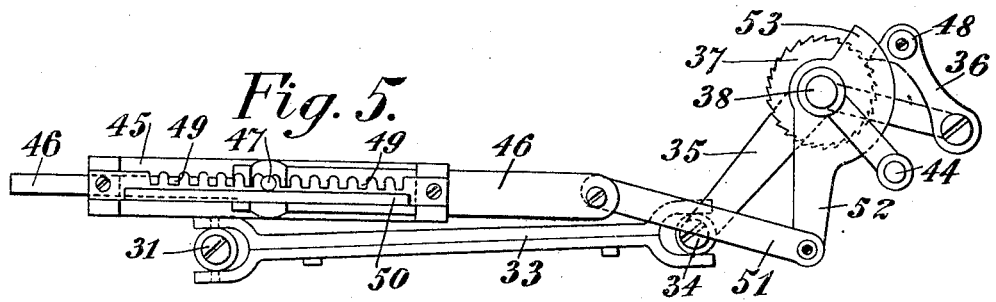
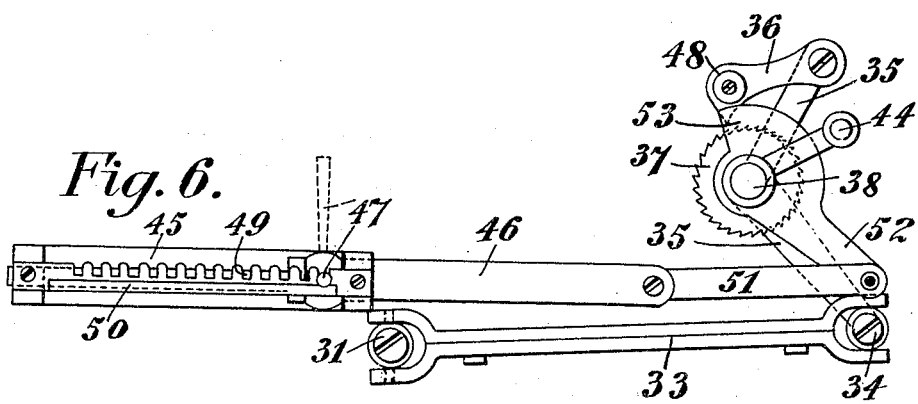
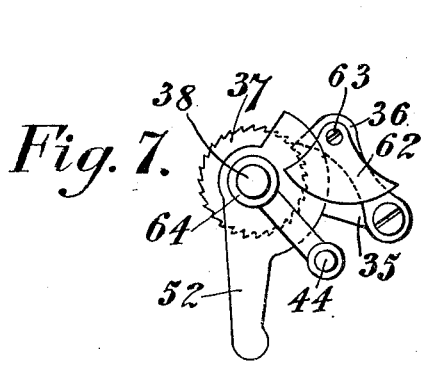
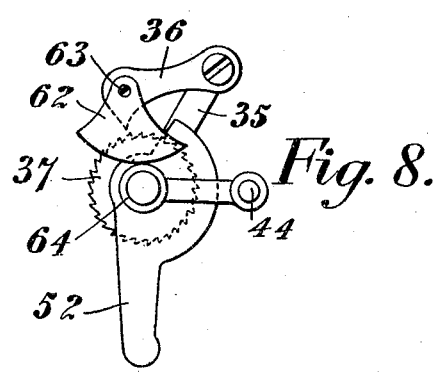
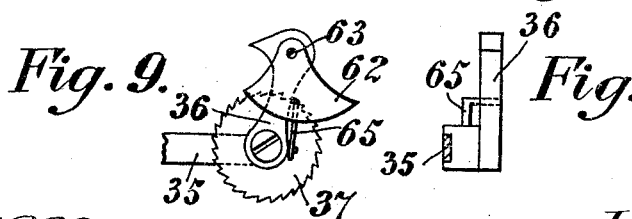

W. A. VAN BERKEL.
MEAT SLICING MACHINE.
APPLICATION FILED NOV. 10, 1908.

920,506.

Patented May 4, 1909.
5 SHEETS—SHEET 5.

Witnesses:
O. F. Nagle
L. Couville

Inventor
Wilhelmus Adrianus Van Berkel.
By Wiedersheim & Fairbanks.
Attorneys

UNITED STATES PATENT OFFICE.

WILHELMUS ADRIANUS VAN BERKEL, OF ROTTERDAM, NETHERLANDS.

MEAT-SLICING MACHINE.

No. 920,506. Specification of Letters Patent. Patented May 4, 1909.

Application filed November 10, 1908. Serial No. 461,895.

*To all whom it may concern:*

Be it known that I, WILHELMUS ADRIANUS VAN BERKEL, a subject of the Queen of the Netherlands, residing at 54 Boezemsingel, Rotterdam, Netherlands, have invented certain new and useful Improvements in Meat-Slicing Machines, of which the following is a specification.

This invention relates to meat slicing machines of the class in which the meat is clamped to a table which latter is moved backward and forward in front of a rotating circular knife which cuts the same into slices by means of its peripheral edge, the body of the knife not coming in contact with the meat. Machines of this character are fully set forth in my prior U. S. specification No. 628742 dated the 11th day of July, 1899.

The object of my invention is the manufacture of a meat slicing machine of the foregoing class which shall be simple to construct, easy running and comparatively noiseless.

Heretofore, in meat slicing machines, there has been an undue amount of noise and friction during operation and a tendency for pieces of fat and grease to find their way into the base of the machine, and, on account of the difficulty of cleaning, to be allowed to accumulate there and become offensive. Owing to the improved construction of the present machine undue noise and friction are avoided and all parts can be easily cleaned and pieces of fat, etc. cannot fall down into the base:
I will now proceed to describe the invention with reference to the drawings annexed, whereon:—

Figures 1, 2:
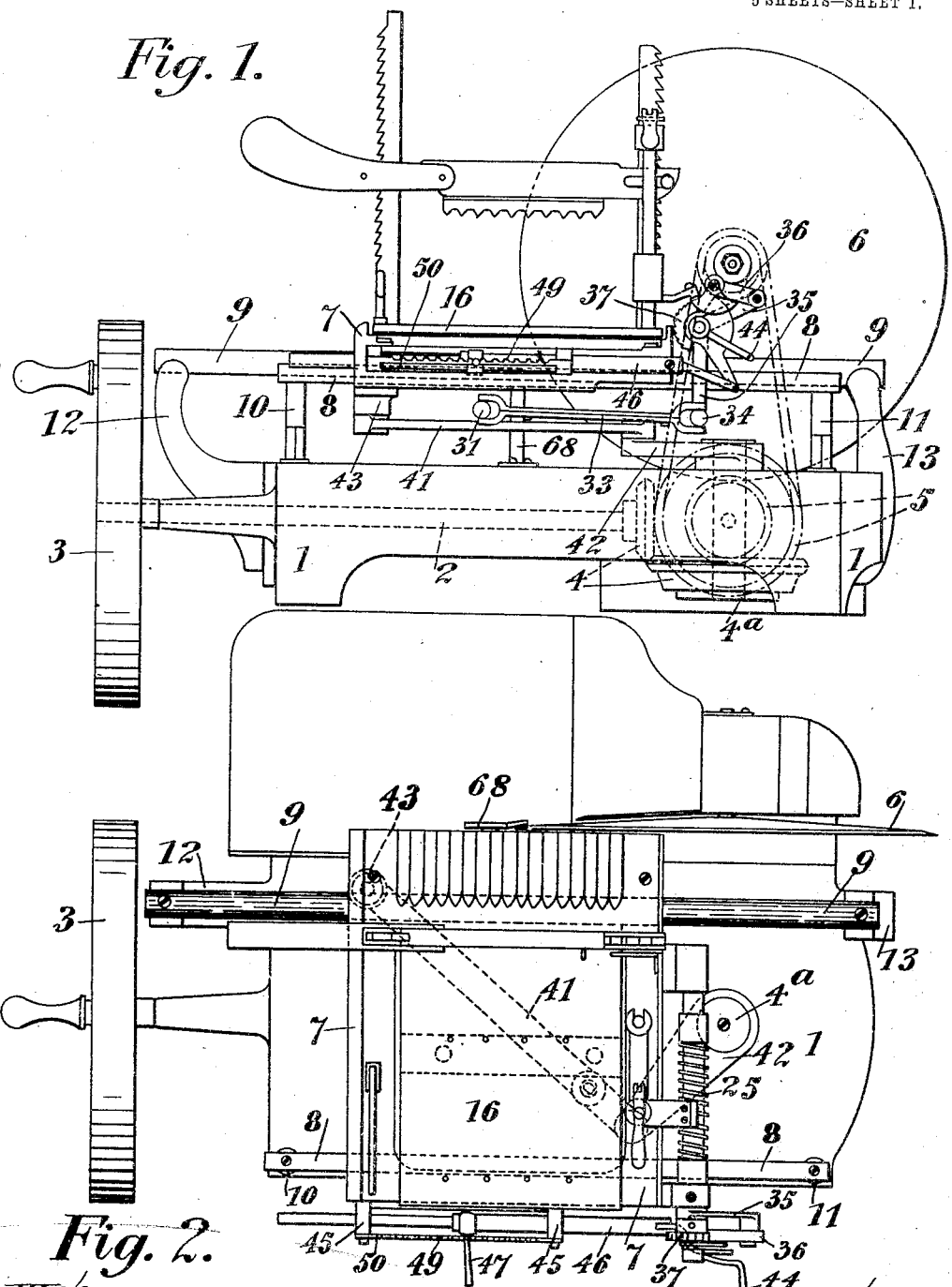
Figure 3:
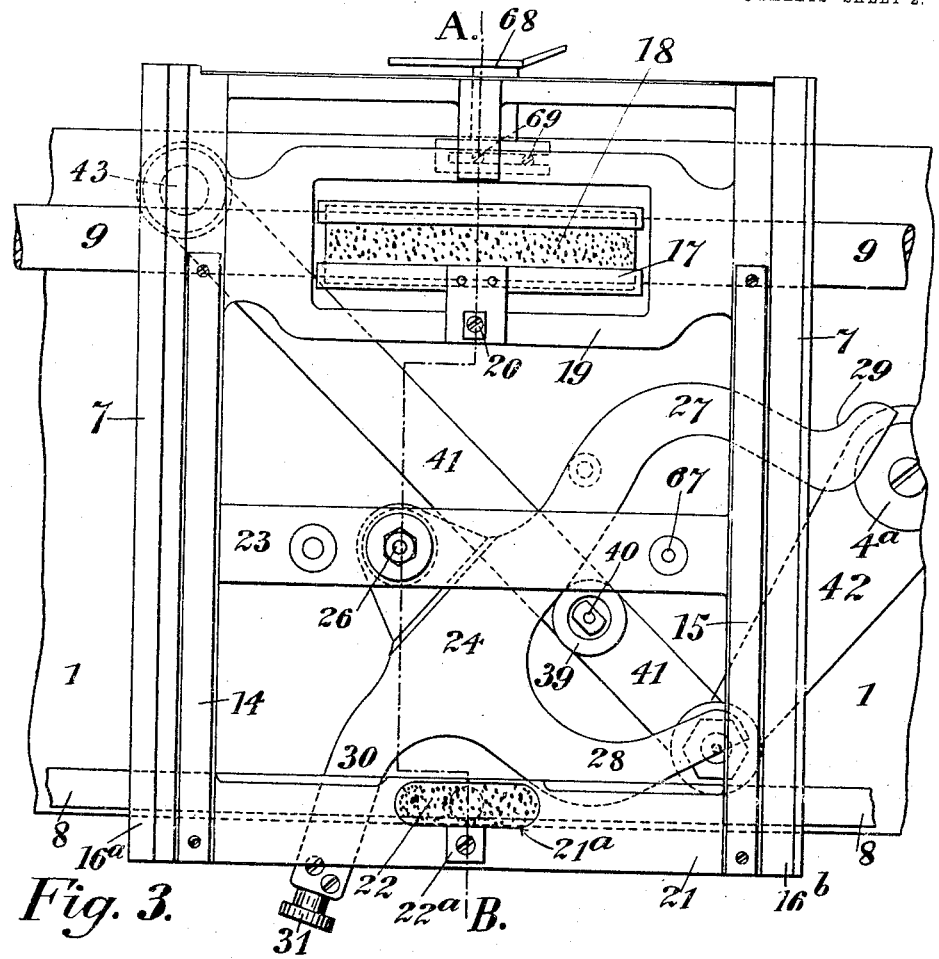
Figure 13:
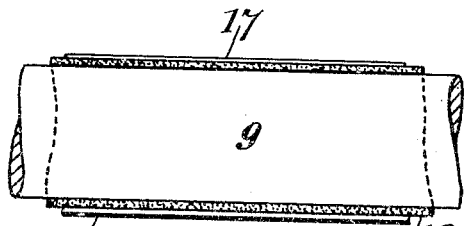
Figure 14:
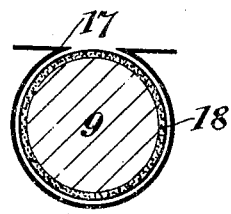
Figure 17:
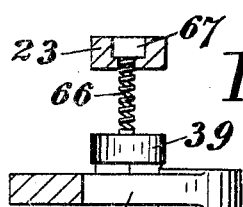

Figure 1 is a side elevation of the machine. Fig. 2 is a plan thereof. Fig. 3 is an enlarged plan view of part of the machine and showing the frame with the meat table removed. Fig. 4 is a section taken on the line A, B, Fig. 3. Figs. 5 to 17 are detail views, Figs. 5 and 6 being enlarged side views of the feed screw operating mechanism, Figs. 7, 8, 9 and 10 being views of the pawl mechanism, Fig. 11 being a plan view of the lever 24, Fig. 12 a modified form of the lever, Fig. 13 an enlarged longitudinal section and Fig. 14 a cross section of the lubricating arrangement for the bar 9, Fig. 15 an enlarged longitudinal section and Fig. 16 an enlarged cross section showing the lubricating pad 22, and Fig. 17 a view of the lubricating device for the roller 39.

On the drawings the same reference characters wherever repeated indicate the same parts.

In carrying out my invention I make the machine with a base or frame 1, made with a solid top without any of the usual openings or slots therein so that small pieces of fat, grease or cuttings of meat, cannot fall down through the base or frame on to the counter or become clogged in the driving mechanism. This base carries the usual driving shaft 2 with its fly wheel and hand 3, and the gear 4 and 5 for driving the knife 6, and by means of the short vertical shaft $4^a$, (which passes through the top of the base) the crank 42 for reciprocating the table. The table itself consists of a sliding open frame 7 comprising two side bars connected by cross pieces or bars 19, 21, and 23 and which is adapted to slide back and forward on guide rails or bars, preferably on a rectangular guide rail 8 and a round guide rail 9, the rectangular guide rail being supported by small vertical pillars 10 and 11 secured to the base while the round rail 9 is supported upon and firmly screwed to brackets 12 and 13 on the base.

$14^a$ is a metal plate screwed to the underside of the frame 7 and engaging the underside of the rail 8.

14, 15, $22^a$ are metal packing pieces.

For the purpose of lubricating the round guide rail 9 a special lubricating device is provided in the frame and consists of a holder 17 (see also Figs. 13 and 14) which conforms to the shape of the guide rail 9 and incloses a felt or other oil pad 18 which surrounds the rail and is supplied with oil as and when required. As the oil pad surrounds the rail 9 and is also carried back and forward by the table as it reciprocates it follows that the rail is kept constantly lubricated, the holder, at the same time preventing oil dripping down on to the base. The pad holds sufficient oil to keep the rail lubricated for a long time. As will be seen the holder 17 is contained in a recess in the bar 19 and is removably secured in position by a screw 20. For the purpose of lubricating the rectangular rail or bar 8 a recess $21^a$ (see also Figs. 15 and 16) is made in the cross bar 21 of the table frame and in this recess a felt or other pad 22 is placed and is kept supplied with oil, this pad thereby, lubricating the guide bar 8, as the table travels backward and forward.

Figure 11:
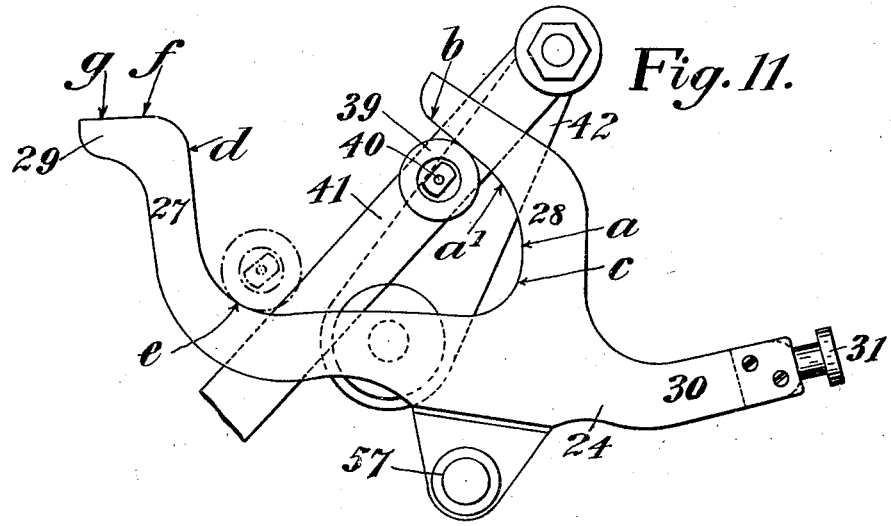

I provide a special feed operating lever 24 which has three arms 27, 28 and 30 the arm 30 being connected by a universally jointed end 31 to a connecting rod 33, universally jointed, at 34, to the lever 35 which is adapted to operate the feed pawl 36 and ratchet wheel 37 of the feed screw 25. The arm 27 has a laterally projecting heel 29 while the arm 28 is curved backward and outward as shown at Fig. 11. This feed lever 24, which is fulcrumed on a pin 26 secured to the cross bar 23 of the table frame, is adapted to be oscillated by a roller 39 on a pin 40 on the connecting rod 41 which operates the table 7 of the machine, this connecting rod being operated by the crank 42 of the driving gear. As will be seen the connecting rod 41 is connected by a pin 43 to one side of the table and underneath the same. The feed operating lever is so made, as shown at Fig. 11, that the feed forward of the meat commences just as the meat clears the knife on the back stroke of the table and then continues on the forward stroke thereof until the meat just touches the knife when the feed ceases, the cutting operation being then performed while the meat is absolutely stationary on the table with the result that the meat is uniformly cut throughout the length of the slice while the meat on the return movement of the table, does not press against the edge of the knife and create friction therewith. On the drawing (see Fig. 11,) when the roller 39 of the connecting rod 41 of the table is traveling along the curve of the jaw, formed by the arms 27, 28, of the lever 24, from the point $a$ to $d$ the table is traveling backward and when the roller 39 travels from the point $d$ along the heel 29 and across the gap of the jaw to the point $a^1$ the table is moving forward. The roller 39, at the back stroke of the table, does not move the lever 24 until it reaches the point $e$ when it acts on the arm 27 and moves the arm 30 and gear link 33, lever 35, and pawl 36, so as to cause the ratchet wheel to operate the feed screw and feed forward the meat on the table, the forward feed of the meat being continued, while the table is traveling again on its forward stroke, until the roller reaches the point $f$ when the forward feed of the pawl ceases. There is no feed of the pawl while the roller is traveling from $f$ to $g$. The back lash of the pawl takes place during the travel of the roller 39 from $b$ to $c$, that is, partly on the forward travel of the table and partly on the back travel thereof.

The lever 24 may have a cylindrical bearing 57 working on the pin 26 the bearing being acted on by a spring 58 the tension of which can be adjusted by the nut 59 (Fig. 4) and which gives a yielding support to the lever 24.

Figure 12:
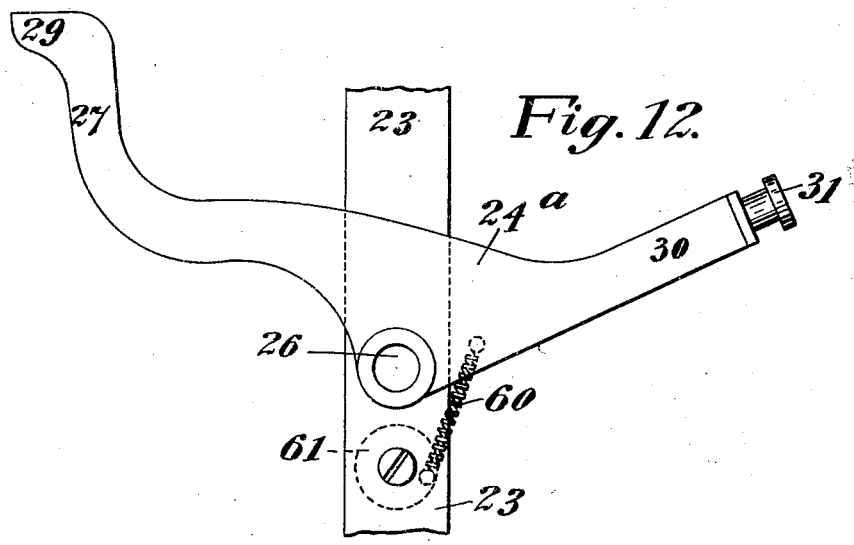

Instead of using the feed operating lever 24 hereinbefore described, I may use a feed operating lever $24^a$ such as shown at Fig. 12, which is without the second arm 28 and is adapted to be operated in one direction by the roller 39 of the connecting rod 41 and in the other direction by a spring 60 attached to the pin 61 of the cross bar 23 of the table frame.

The feed screw 25 is, preferably, provided with a small handle 44 whereby it can be operated by hand, as and when desired, so as to feed forward the meat plate.

For the purpose of quickly and nicely regulating the thickness of the meat slices, I provide the reciprocating table 7 with a bracket 45 (see also Figs. 5 and 6) in which is free to slide backward and forward a short slide bar 46 having connected to it a handle 47 whereby it can be operated, said handle being turnably secured to said slide bar. The handle 47 has a reduced part which is adapted to engage with the nicks 49 of a gage plate 50 attached to the bracket 45 and each nick is numbered, the numbers preferably running from 0 to 14. The movement of the slide 46 operates a connecting rod 51 and the lever 52, fulcrumed on the end of the feed screw 25 and having a cam 53 so arranged as to regulate the action of the pawl 36 by engaging the roller 48 of the pawl and causing it to take one or more teeth of the ratchet wheel 37 according to the thickness of slices desired. The slide is moved by the handle 47 to the desired position and then the slide is locked by causing the handle to engage a nick 49 in the plate 50 and as the nicks are graduated to suit the thickness of slices, it follows that a nice adjustment can be obtained. Fig. 5 shows the handle 47 in about the mid position so as to give slices of medium thickness the cam lever 52 being in the vertical position and the cam 53 holding the pawl out of engagement with the ratchet wheel so that, at the next forward throw of the pawl, it will miss those teeth, in advance of it, which are covered by the cam and turn the screw 25 accordingly. In Fig. 6 the handle is shown in the last nick so as to give no feed to the screw 25 and no feed to the meat with the result that no slices are cut, the pawl being held during its back and forward throws out of engagement with the ratchet wheel by the cam 53 which is turned around to its maximum position. If the handle 47 is moved one nick to the left (Fig. 6) very thin slices are given as the cam 53 only allows the pawl to feed the ratchet wheel one tooth or so at a time. It will be seen that by this simple arrangement the slices can be nicely regulated in thickness. With this arrangement no springs are used so that durability combined with simplicity is obtained while there is an avoidance of noise due to spring action. The feed mechanism can also be quickly thrown out of action by simply moving the handle 47 to the zero nick.

In order to render the back lash of the pawl over the teeth of the ratchet wheel 37 silent a swinging cam piece 62 is slung freely from the pin 63 of the pawl, this cam piece being so shaped and arranged, as shown, that when the pawl is passing back over the ratchet teeth it bears on the roller 64 and lifts the pawl out of contact with the teeth, but, when the pawl is feeding the ratchet wheel, the cam piece does not bear on the roller 64. In Fig. 7 the cam piece 62 is shown out of contact with the roller 64 on the feed screw spindle and the pawl is shown just before beginning its feed movement. In Fig. 8 the pawl is shown as on its back movement and it will be seen that it is held away from the teeth of the ratchet by the cam piece 62 bearing on the roller 64.

In order to prevent the attendant operating the machine too quickly, the pawl 36 is so arranged, as shown, Fig. 9, that it is automatically thrown out of engagement. To effect this the pawl is loosely connected to the lever 35 so that, when the machine is operated very quickly, the centrifugal force engendered by the crank lever moving rapidly through an arc of a circle automatically throws back the pawl into the position shown at Fig. 9 where it is held by a support 65 on the lever 35 so as to move into working position on the speed being reduced.

In order to lubricate the roller 39 on the connecting rod 41 of the driving crank, a simple device is arranged consisting of a wire spiral 66 (Fig. 17) which is secured to the cross bar 23 at the bottom of a countersunk hole 67 therein. This wire spiral contains a cotton or other wick which is lubricated by oil in the hole 67 and is adapted to be struck by the top of the pin of the roller 39 at each reciprocation of the table and thereon drop a little oil into said roller and lubricate the same.

68 is a T shaped bracket serving as a slice support.

Of course, if so desired, instead of having the table to slide on a round bar and a square bar the latter bar may be made flat or of D or like shape.

Having now fully described my invention what I claim and desire to secure by Letters Patent is:—

1. A meat slicing machine comprising, in combination, a base, rails above the base, a meat table slidably mounted on said rails, means for sliding the table on the rails, a feed lever pivoted to said table, means for operating the said feed lever from said table sliding means, means operated by the feed lever for feeding the meat forward on the table, a rotating cutting knife and means for operating the said knife.

2. A meat slicing machine comprising, in combination, a base, a round rail mounted on the base, a rail of rectangular section mounted on the base parallel to the said round rail, a meat table mounted on said rails, means for operating the table, a feed lever pivoted to said table, means for operating the said feed lever from said table operating means, means operated by the feed lever for feeding the meat forward on the table, a rotating cutting knife and means for operating the said knife.

3. A meat slicing machine comprising, in combination, a base with solid top, two parallel rails above the base, vertical supports for each of said rails, a meat table slidably mounted on said rails, means for operating the table, a feed lever pivoted to said table, means for operating the said feed lever from said table operating means, means operated by the feed lever for feeding the meat forward on the table, a rotating cutting knife and means for operating the said knife.

4. A meat slicing machine comprising, in combination, a base, a round rail supported above the base, a rectangular rail supported above the base parallel to the round rail, a frame slidably mounted on said rails and having openings therein through which the rails can pass, means at the underside of said frame engaging the underside of said rectangular rail, a slidable meat plate on said frame, means for feeding forward said meat plate on the frame, means for reciprocating the frame on said rails a feed lever pivoted to said frame, means for operating the feed lever from said frame operating means, means operated by the feed lever for feeding the meat plate forward on the frame, a rotating cutting knife and means for operating the said knife.

5. A meat slicing machine comprising, in combination, a base, two parallel rails arranged above the base, an open frame with three cross bars slidably mounted on said rails and having openings in two of the bars for the rails to pass through, a slidable meat plate on said frame, means for feeding forward said meat plate on the frame, means for reciprocating the frame on said rails, a feed lever pivoted to the underside of one of the bars of the said frame, means for operating the feed lever from said frame operating means, means operated by the feed lever for feeding the meat plate forward on the frame, a rotating cutting knife and means for operating the said knife.

6. A meat slicing machine comprising, in combination, a base, rails supported above the base, a meat table mounted on said rails, means for operating the table, a feed lever with three arms pivoted to said table, means for operating the said feed lever from said table operating means, means operated by the feed lever for feeding the meat forward on the table, a rotating cutting knife and means for operating the said knife.

7. A meat slicing machine comprising, in combination, a base, rails supported above the base, a meat table mounted on said rails, means for operating the table, a feed lever having an arm with a heel thereon a second arm with a joint piece thereon and a third intermediate curved arm said lever being pivoted to the table, means for operating the said feed lever from said table operating means, means operated by the feed lever for feeding the meat forward on the table, a rotating cutting knife and means for operating the said knife.

8. A meat slicing machine comprising, in combination, a base, a meat table mounted thereon, means for reciprocating the meat table, a feed lever pivoted to said table, a meat plate on the table, means actuated by the feed lever for moving the meat plate on the table, means for regulating the amount of movement consisting of a sliding bar, a gage plate and a handle on the bar adapted to engage said gage plate, means for operating the said feed lever from said table reciprocating means, means operated by the feed lever for feeding the meat forward on the table, a rotating cutting knife and means for operating the said knife.

9. A meat slicing machine, comprising, in combination, a base, a meat table mounted thereon, means for reciprocating the meat table, a feed lever pivoted to said table, a meat plate on the table, a link jointed to the feed lever, a bell crank lever, a pawl thereon, a feed screw for the meat plate, a ratchet thereon, a movable cam lever on the screw spindle, a sliding bar connected therewith, a turnable handle on the bar, a gage plate with indentations therein, means for operating the said feed lever from said table reciprocating means, means operated by the feed lever for feeding the meat forward on the table, a rotating cutting knife and means for operating the said knife.

10. A meat slicing machine comprising, in combination, a base, a meat table mounted thereon, means for reciprocating the meat table, a feed lever pivoted to said table, a meat plate on the table, a link jointed to the feed lever, a bell crank lever, a pawl thereon, a feed screw for the meat plate, a ratchet thereon, a movable cam lever on the screw spindle, and adapted to regulate the action of said pawl, a link, a sliding bar connected therewith, a turnable handle on the bar, a gage plate with indentations therein fitted to the side of the meat table, means for operating the said feed lever from said table reciprocating means, means operated by the feed lever for feeding the meat forward on the table, a rotating cutting knife and means for operating the said knife.

11. A meat slicing machine comprising, in combination, a base, a meat table mounted thereon, means for reciprocating the meat table, a feed lever pivoted to said table, means for actuating the feed lever from the table reciprocating means, a meat plate on the table, a screw for moving the meat plate, a ratchet, a pawl, means connected with the feed lever for operating said pawl, means for regulating the action of said pawl, means for lifting said pawl away from the ratchet at its back lash, a rotating cutting knife and means for operating the said knife.

12. A meat slicing machine comprising, in combination, a base, a meat table mounted thereon, means for reciprocating the meat table, a feed lever pivoted to said table, means for actuating the feed lever from the table reciprocating means, a meat plate on the table, a screw for moving the meat plate, a ratchet, a pawl, means connected with the feed lever for operating said pawl, means for regulating the action of said pawl, a free swinging cam for lifting said pawl away from the ratchet at its back lash, a rotating cutting knife and means for operating the said knife.

13. A meat slicing machine, comprising, in combination, a base, rails above the base, a meat table mounted on said rails, means for operating the table, a feed lever pivoted to said table, means for operating the said feed lever from said table operating means, means operated by the feed lever for feeding the meat forward on the table, means for lubricating the rails as the table travels backward and forward, a rotating cutting knife and means for operating the said knife.

14. A meat slicing machine comprising, in combination, a base, a round rail mounted on the base, a rail of rectangular section mounted on the base parallel to the said round rail, a meat table mounted on said rails, means for operating the table, a feed lever pivoted to said table, means for operating the said feed lever from said table operating means, means operated by the feed lever for feeding the meat forward on the table, a cylindrical oil pad carried by the table for lubricating the round rail, a rotating cutting knife and means for operating the said knife.

15. A meat slicing machine comprising, in combination, a base, a round rail mounted on the base, a rail of rectangular section mounted on the base parallel to the said round rail, a meat table mounted on said rails, means for operating the table, a feed lever pivoted to said table, means for operating the said feed lever from said table operating means, means operated by the feed lever for feeding the meat forward on the table, a cylindrical oil pad carried by the table for lubricating the round rail, an oil pad carried by the table for lubricating the upper side of the rectangular rail, a rotating cutting knife and means for operating the said knife.

16. A meat slicing machine comprising, in combination, a base, a round rail supported above the base, a rectangular rail supported above the base parallel to the round rail, a frame slidably mounted on said rails and having openings therein through which the rails can pass, a cylindrical oil pad fitted in the recess of the frame for lubricating the round rail, an oil pad fitted into a recess in the frame for lubricating the rectangular rail, a slidable meat plate on said frame, means for feeding forward said meat plate on the frame, means for reciprocating the frame on said rails, a feed lever pivoted to said frame, means for operating the feed lever from said frame operating means, means operated by the feed lever for feeding the meat plate forward on the frame, a rotating cutting knife and means for operating the said knife.

17. A meat slicing machine comprising, in combination, a base, a round rail supported above the base, a rectangular rail supported above the base parallel to the round rail, a frame slidably mounted on said rails and having openings therein through which the rails can pass, means at the underside of said frame engaging the underside of said rectangular rail, a slidable meat plate on said frame, a shaft, means for operating the shaft, a crank operated by said shaft, a connecting rod jointed to said crank and to said frame, a roller on said connecting rod, a feed lever with three arms one of which is acted on by said roller, said feed lever being pivoted to the frame, a screw for feeding the meat plate forward on the frame, a ratchet, a pawl, a lever for operating said pawl, a link jointed to said pawl operating lever and to one of the arms of the said feed lever, a cam lever acting on said pawl, a slide acting on said cam lever, a gage plate with nicks therein, a handle fitted on said slide and adapted to engage said nicks, a rotating cutting knife and means for operating the said knife.

In testimony whereof I affix my signature in presence of two witnesses.

WILHELMUS ADRIANUS VAN BERKEL.

Witnesses:
ADOLF ARIS KLEIN,
PIETER CORNELIS DE GROOT.